United States Patent
Phillips

(10) Patent No.: US 7,077,479 B1
(45) Date of Patent: Jul. 18, 2006

(54) VEHICULAR ARM REST COVER

(76) Inventor: Glenda J. Phillips, 2 Sarah La., Fort Walton Beach, FL (US) 32547

( * ) Notice: Subject to any disclaimer, the term of this patent is extended or adjusted under 35 U.S.C. 154(b) by 0 days.

(21) Appl. No.: 11/001,512

(22) Filed: Dec. 2, 2004

(51) Int. Cl.
*B60N 2/44* (2006.01)

(52) U.S. Cl. .................................. 297/463.2

(58) Field of Classification Search ............... 297/228, 297/227, 224, 219.1, 188.14, 463.1, 463.2; D6/611, 610; 150/158; 40/593
See application file for complete search history.

(56) References Cited

U.S. PATENT DOCUMENTS

| | | | |
|---|---|---|---|
| 1,094,154 A | 4/1914 | Furge | |
| 1,489,113 A | 4/1924 | Brookbank | |
| 1,804,841 A | 5/1931 | Dedroli | |
| 1,809,292 A | 6/1931 | Fry | |
| 1,856,868 A | 5/1932 | Fry | |
| 2,004,982 A | 6/1935 | Fry | |
| 2,057,551 A | 10/1936 | Bishop | |
| 2,418,092 A * | 3/1947 | Passel | 297/227 |
| 2,520,587 A | 8/1950 | Underwood et al. | |
| 2,551,214 A * | 5/1951 | Lenz | 297/224 |
| 2,633,186 A | 3/1953 | Jeckell | |
| 2,703,602 A | 3/1955 | Greenstadt | |
| D175,837 S | 10/1955 | Jeckell | |
| 2,721,605 A | 10/1955 | Griffiths et al. | |
| D178,372 S | 7/1956 | Jeckell | |
| 2,891,604 A | 6/1959 | Soucie | |
| RE25,133 E | 3/1962 | Reavis et al. | |
| 3,634,925 A | 1/1972 | Van Loo | |
| D243,304 S | 2/1977 | Fuqua | |
| 4,285,544 A | 8/1981 | Zapf | |
| D382,165 S | 8/1997 | Ruiz | |
| 5,700,053 A | 12/1997 | Downing | |
| 5,911,472 A * | 6/1999 | Toth | 297/188.2 |
| 6,572,194 B1 | 6/2003 | True | |
| 6,604,789 B1 | 8/2003 | Downing | |
| 2003/0056866 A1 * | 3/2003 | Sheppard, Jr. | 150/160 |
| 2003/0146228 A1 * | 8/2003 | Davis et al. | 220/739 |

FOREIGN PATENT DOCUMENTS

EP 0443726 * 8/1991

* cited by examiner

*Primary Examiner*—Milton Nelson, Jr.
(74) *Attorney, Agent, or Firm*—Peter Loffler

(57) ABSTRACT

An arm rest cover is slipped over an arm rest within a vehicle in order to aesthetically cover the arm rest with a desired design. An elongate cover member has a closed first end and a second end with an opening, the opening located either on a longitudinal axis of the cover member or radially offset from the longitudinal axis. The arm rest passes through the opening and the cover member is slipped over the arm rest until it is in substantially covering relationship with the arm rest. The cover member may be made from an elastic material such as a nylon-spandex mix.

7 Claims, 2 Drawing Sheets

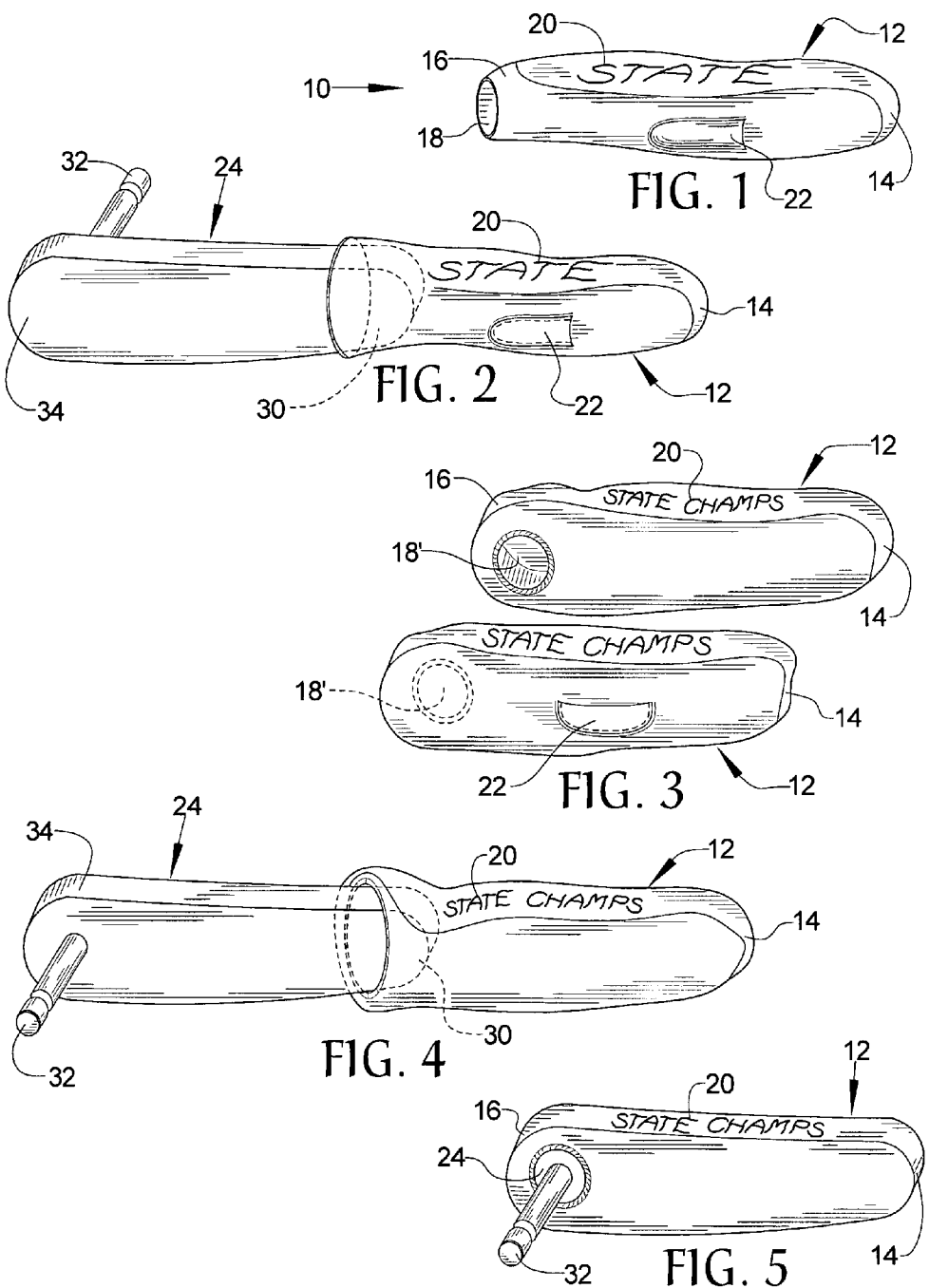

VEHICULAR ARM REST COVER

BACKGROUND OF THE INVENTION

1. Field of the Invention

The present invention relates to an arm rest cover for aesthetically covering the arm rest of a vehicle.

2. Background of the Prior Art

Sports fans everywhere love to show team spirit especially on game day. Shirts, hats, and other clothing, flags flying from houses, and facial painting are but a few of the examples of how many fans show team pride. One area for fan pride that gets particular treatment is a person's vehicle. Window flags, bumper and window stickers, as well as vanity license plates are a few ways that fans root for the home team. Some fans go to even greater lengths and have elaborate decorations and paint jobs on their vehicle in order to let others on the road know who the vehicle's owner thinks is the best team, the only limiting factor being the creativity of the designers. While a fan can get the outside of a vehicle pretty dressed up for the big game, the inside of the vehicle has been given far less attention in showing team pride. The interior of a vehicle lends itself less to team spirit makeup and currently fans are mainly limited to playing a team's fight song and to adhere an appropriate team sticker to a desired surface of the vehicle. The problems with the available approaches are that the driver and passengers may want to hear their team's game or a pregame analysis of the game, or may want to hear a rival's game on the radio precluding the playing of the fight song on the sound system. Additionally, adhering a sticker to many inside surfaces of a vehicle may cause damage to the surface, and at the very least will leave a gluey residue upon removal, which residue is difficult to remove. Furthermore, a sticker is semi-permanent and poses problems for the fan that has many favorite teams, both college and professional (and not to forget high school and other teams) throughout the year.

Accordingly, there exists a need in the art for a device that allows a person to dress up the interior of a vehicle in order to show team spirit, which device addresses the above-stated problems found in the art. Specifically, such a decorative device must not rely on the use of the vehicle's sound system in order to allow the vehicle's occupants to be able to listen to the radio or other audio sources. Such a device must not be so permanent so that its removal is relatively difficult and potentially injurious to the vehicle's interior. Ideally, such a device will be of simple design and construction so that it is relatively inexpensive to manufacture and acquire. The device should be simple to install and to remove so that different teams can be supported without undue difficulty.

SUMMARY OF THE INVENTION

The vehicular arm rest cover of the present invention addresses the aforementioned needs in the art. The vehicular arm rest cover is a device that allows a person to aesthetically dress up the interior of a vehicle in order to show team spirit. The vehicular arm rest cover does not rely on the use of the vehicle's sound system, thereby freeing the vehicle's occupants to be able to listen to the radio or other audio sources. The installation of the vehicular arm rest cover is of a temporary nature so that its removal is relatively straightforward without being potentially injurious to the vehicle's interior. The present invention is of simple design and construction making the device relatively inexpensive to manufacture and acquire. The vehicular arm rest cover is very simple to install and to remove allowing the driver to be able to support different teams without undue difficulty.

The vehicular arm rest cover of the present invention is comprised of an elongate cover member that a first end that is closed and a second end that has an opening. The cover member has a design on an outer surface. The cover member is slipped over an arm rest by passing the arm rest through the opening and sliding the cover member along the arm rest until the cover member is in substantially covering relationship with the arm rest. The opening of the cover member is either located on a longitudinal axis of the cover member or is radially oriented from the longitudinal axis of the cover member. The design is embroidered on the cover member. The cover member is made from an elasticized material such as a nylon-spandex mix. A pocket can be located on the outer surface of the cover member.

BRIEF DESCRIPTION OF THE DRAWINGS

FIG. 1 is a perspective view of the vehicular arm rest cover of the present invention with a longitudinally aligned opening.

FIG. 2 is a perspective view of the vehicular arm rest cover of FIG. 1 being installed on an arm rest.

FIG. 3 is a left and right perspective view of the vehicular arm rest cover of the present invention.

FIG. 4 is a perspective view of the vehicular arm rest cover of FIG. 3 being installed on an arm rest.

FIG. 5 is a perspective view of the vehicular arm rest cover of FIG. 3 fully installed on the arm rest.

Similar reference numerals refer to similar parts throughout the several views of the drawings.

DESCRIPTION OF THE PREFERRED EMBODIMENT

Figure 6:
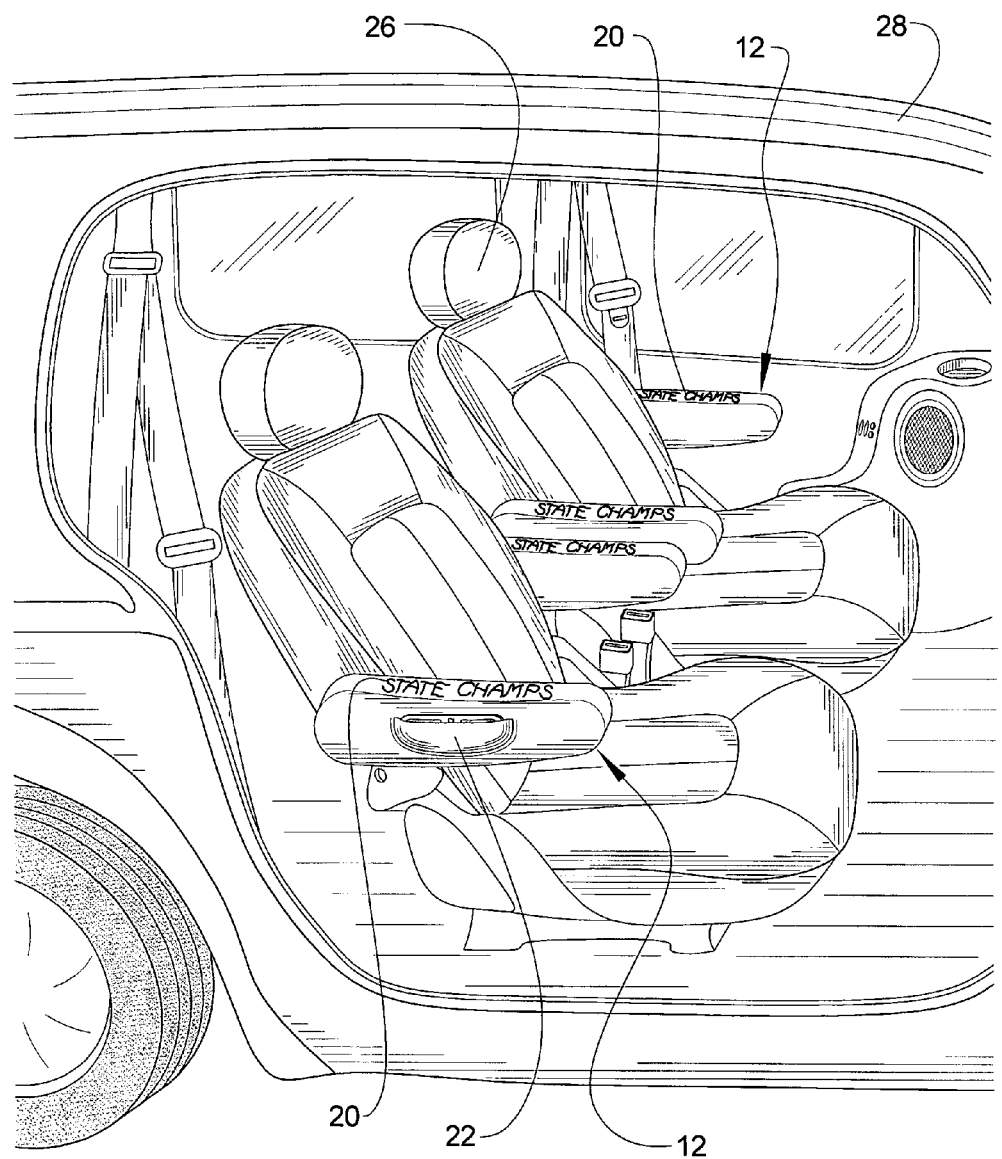
FIG. 6 is an environmental view illustrating several vehicular arm rest covers installed within a vehicle.

Referring now to the drawings, it is seen that the vehicular arm rest cover of the present invention, generally denoted by reference numeral 10, is comprised of an elongate cover member 12 that a first end 14 that is closed and a second end 16 that has an opening. The opening 18 of the cover member 12 is either located on a longitudinal axis of the cover member 12, as best illustrated in FIGS. 1 and 2, or the opening 18' is radially offset from the longitudinal axis of the cover member 12, as best illustrated in FIGS. 3–5. The cover member 12 has a design 20 on an outer surface of the cover member 12, which design 20 is embroidered thereon. The design 20 is any desired design such as the favorite team of the moment of the driver. The cover member 12 may made from an elasticized material such as a nylon-spandex mix wherein the nylon is in a greater ratio relative to the spandex. Advantageously, the cover member 12 has some moisture absorbent qualities, and may have a moisture absorbent layer (not illustrated), in order to absorb any perspiration of a user placing his or her arm thereon. A pocket 22, having either a sideward opening (FIGS. 1 and 2) or an upward opening (FIG. 3) may be provided on the outer surface of the cover member 12.

In order to install the vehicular arm rest cover 10 onto an arm rest 24 of a seat 26 of a vehicle 28, the cover member 12 is positioned so that its opening 18 or 18' faces the distal end 30 of the arm rest 24 (that end opposite the support post 32 of the arm rest 24) and the cover member 12 is slipped over the arm rest 24 and slid along the arm rest 24 until the cover member 12 is in substantially covering relationship with the arm rest 24. If the cover member 12 has a longitudinal oriented opening 18, then either the cover member 12 is slid until it reaches the support post 32 of the arm rest or a portion of the outer lip of the cover member 12 at the opening 18 is tucked over the proximal end 34 of the arm rest 24. If the cover member 12 has a radially offset opening 18' then the second end 16 of the cover member 12 is slipped over the proximal end 34 of the arm rest 24 until the support post 32 is received within the opening 18', as best illustrated in FIG. 5. In order to remove the cover member 12 from the arm rest 24, the process is simply reversed and the cover member 12 is simply slipped off of the arm rest 24, if necessary, untucking the second end 16 or portion thereof from the proximal end 34 of the arm rest 24. Accordingly, the cover member 12 is easy to install onto and remove from the arm rest 24 so that a person can install one set of cover members 12 on a Saturday to root for his or her favorite college team and then quickly and easily swap out the Saturday teams with a new set of cover members 12 representing the person's favorite professional team that plays on Sunday. During the off season, other decorative cover members 12 can be installed onto the arm rest 24 of the vehicle 28.

The elastic nature of the cover member 12 allows easy slippage of the cover member 12 over the arm rest 24, and allows the cover member 12 to expand for differing sizes of arm rest 24. Advantageously, although not necessarily, the cover member 12 in its uninstalled state has a diameter that is less than the diameter of the arm rest 24 unto which it is to be installed. As such, the cover member 12 must expand in order to fit over the arm rest 24, and once the cover member 12 is installed, it remains in an expanded state and the elastic nature of the cover member 12 biases the cover member 12 against the arm rest 24 and helps hold the cover member 12 in place over the arm rest 24. This is especially important when using a cover member 12 with a longitudinally disposed opening 18.

While the invention has been particularly shown and described with reference to embodiments thereof, it will be appreciated by those skilled in the art that various changes in form and detail may be made without departing from the spirit and scope of the invention.

I claim:

1. A method of temporarily covering an arm rest of a seat of a vehicle, the arm rest having a fitted cover thereon and having a fixed end attached to the vehicle by a support post and a free end that extends outwardly from the support post, the method comprising the steps of:
   providing an elongate cover member having a first end that is closed and a second end that has a single opening;
   providing a design on an outer surface of the cover member; and
   passing the arm rest through the opening of the cover member and sliding the cover member along the arm rest until the arm rest is substantially covered by the cover member and the opening of the second end is positioned at the support post and that the outer surface of the cover member is continuously smooth after the cover member covers the arm rest.

2. The method as in claim 1 wherein the opening is located on a longitudinal axis of the cover member.

3. The method as in claim 1 wherein the opening is radially offset from a longitudinal axis of the cover member.

4. The method as in claim 1 wherein the design is embroidered on the cover member.

5. The method as in claim 1 wherein the cover member is made from an elasticized material.

6. The method as in claim 1 wherein the cover member is made from a nylon and spandex mix.

7. The method as in claim 1 further comprising a pocket located on an outer surface of the cover member, the pocket being raised upwardly from the outer surface of the cover member.

* * * * *